(12) United States Patent
Walter

(10) Patent No.: US 9,460,146 B2
(45) Date of Patent: Oct. 4, 2016

(54) COMPONENT FOR MASS CHANGE OF DATA

(75) Inventor: Wolfgang Walter, Heidelberg (DE)

(73) Assignee: SAP SE, Walldorf (DE)

( * ) Notice: Subject to any disclaimer, the term of this patent is extended or adjusted under 35 U.S.C. 154(b) by 368 days.

(21) Appl. No.: 13/564,597

(22) Filed: Aug. 1, 2012

(65) Prior Publication Data

US 2014/0040320 A1 Feb. 6, 2014

(51) Int. Cl.
*G06F 17/30* (2006.01)

(52) U.S. Cl.
CPC ..... *G06F 17/30365* (2013.01); *G06F 17/3038* (2013.01)

(58) Field of Classification Search
CPC .................................................. G06F 17/3038
See application file for complete search history.

(56) References Cited

U.S. PATENT DOCUMENTS

| | | | | |
|---|---|---|---|---|
| 6,704,743 B1 * | 3/2004 | Martin | ................... | G06F 9/4433 707/786 |
| 6,907,424 B1 * | 6/2005 | Neal et al. | ..................... | 707/706 |
| 2004/0088208 A1 * | 5/2004 | Runge | ................ | G06Q 10/0633 705/7.31 |
| 2007/0005975 A1 * | 1/2007 | Bauchot et al. | .............. | 713/171 |
| 2007/0256043 A1 * | 11/2007 | Peters et al. | ..................... | 716/11 |
| 2012/0216081 A1 * | 8/2012 | Duvvoori | ............... | G06Q 10/06 714/48 |

OTHER PUBLICATIONS

Excel-Filters: Auto Filter Basics (First published on Aug. 11, 2002 according to wayback machine.).*

Patrik Luca, "Bulk update of a field for existing SharePoint list items," posted at IT Pro Rambling, http://patrikluca.blogspot.com/2008/08/bulk-update-of-field-for-existing.html (Aug. 20, 2008) (6 pages).
Oracle Clinical Conducting a Study Release 4.6.2, "6 Making Mass Changes," http://docs.oracle.com/cd/E22982_01/doc.462/e18821/mmc.htm (accessed on May 29, 2012) (18 pages).
Oracle Advanced Pricing User's Guide, "Making Bulk Changes across a Selected Group of Lines," http://docs.oracle.com/cd/E18727_01/doc.121/e13427/T328362T328369.htm (accessed on May 29, 2012) (6 pages).
SAP, "Executing Mass Changes Directly," http://help.sap.com/saphelp_45b/helpdata/en/ce/a9e53409a811d2a5f80000e82de7c3/content.htmand (accessed on May 29, 2012) (3 pages).
SAP, "Replacing a Particular Value," http://help.sap.com/saphelp_45b/helpdata/en/0d/9ebda1075711d2a5f70000e82de7c3/content.htm (accessed on May 29, 2012) (1 page).
TM1 Forum, "Mass change to selective records with drop-down box," http://www.tm1forum.com/viewtopic.php?f=3&t=7088 (accessed on May 29, 2012) (5 pages).

* cited by examiner

*Primary Examiner* — Miranda Huang
(74) *Attorney, Agent, or Firm* — Klarquist Sparkman, LLP

(57) ABSTRACT

Tools and techniques for performing a mass change to data are described. Attribute values in a data set can be replaced or overwritten based on a user request. The user request can be based on user selections and inputs made via a user interface. The user can limit the attribute values that are replaced based on attribute, attribute value, and/or other designation. The user interface can facilitate user execution of the mass change by presenting lists of attribute values and/or attributes to the user for selection. The list of attribute values can be limited based on a user designation of data elements for mass change. A mass change component can be configured to control directly or indirectly the user interface or portions thereof. The mass change component can initiate the mass change of the data, based on the user selections and inputs.

19 Claims, 5 Drawing Sheets

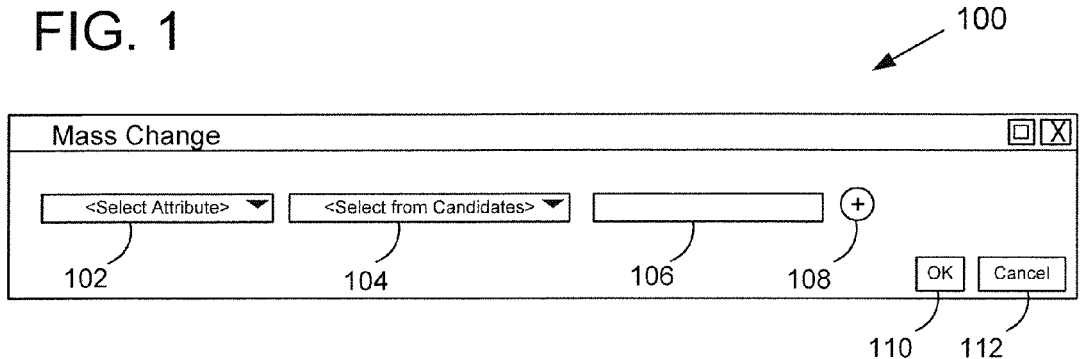
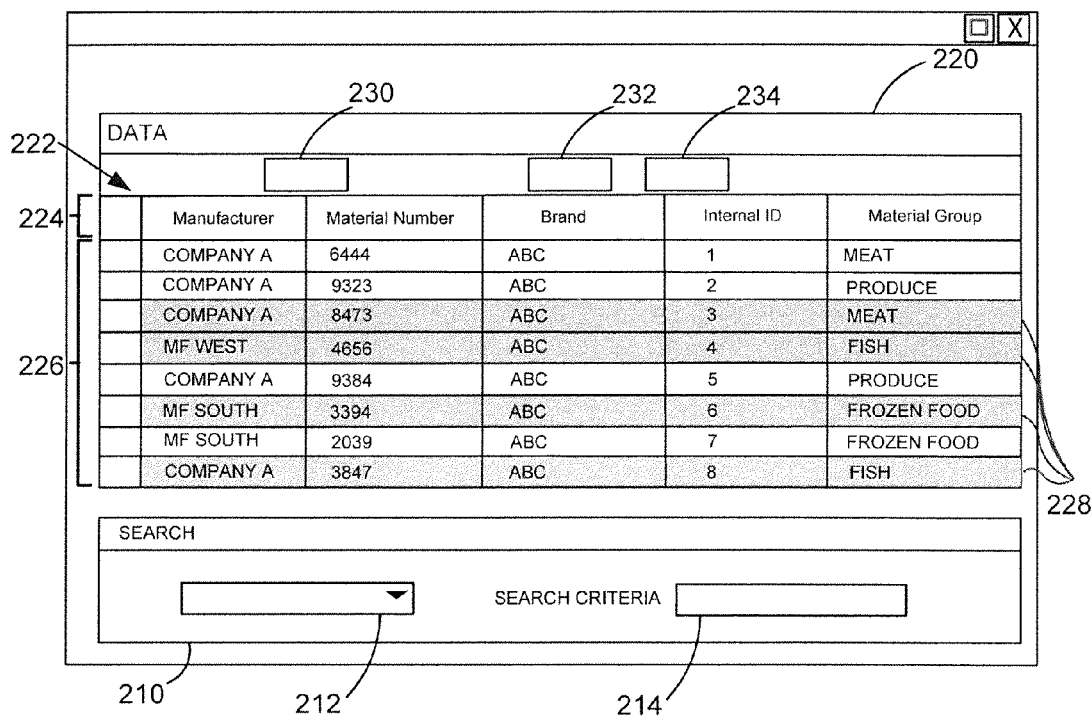
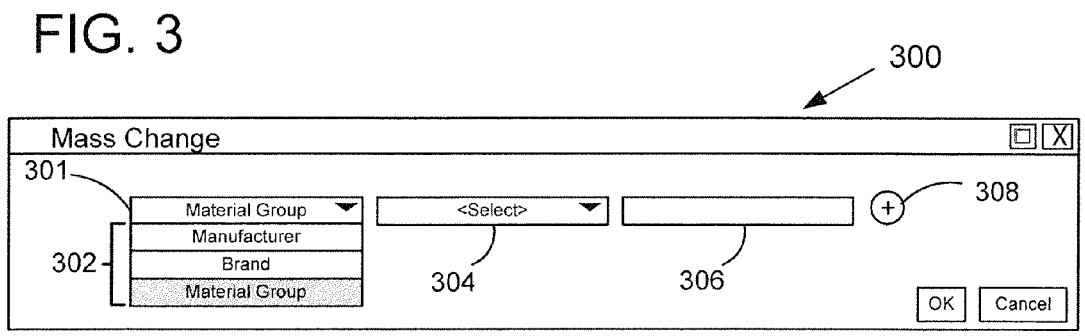

FIG. 4
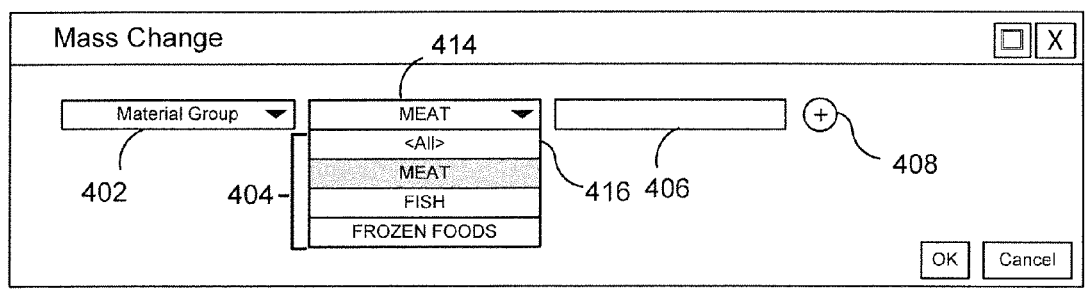
FIG. 5
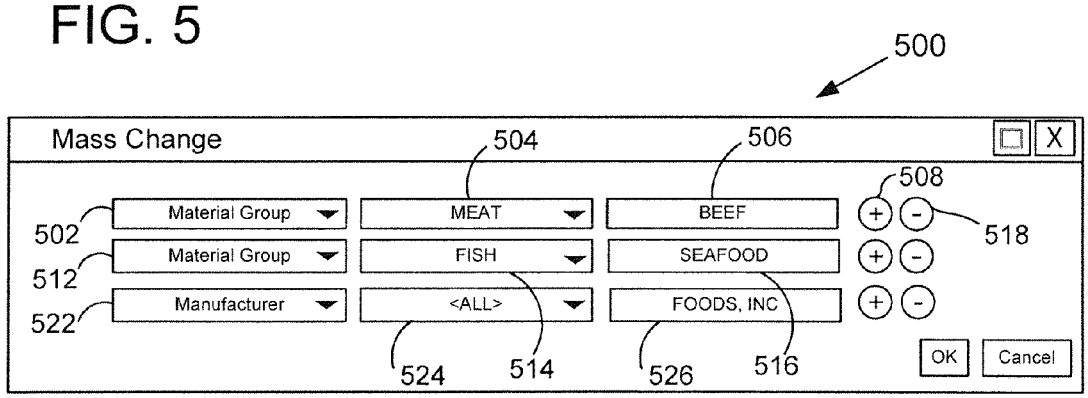
FIG. 6

COMPONENT FOR MASS CHANGE OF DATA

BACKGROUND

As part of typical business practices, data often must be updated or changed by a user. Frequently these changes are mass changes, or changes to or across relatively large amounts of data. For example, a business may decide to rename a product, which requires all objects or data sets that refer to the product to be updated with the new name. As another example, a data set uploaded or transferred between data management programs may incur formatting errors that need to be corrected across the entire data set, or a portion thereof. In such circumstances, mass changes to data must be carried out by the end user to ensure data correctness and continued business viability.

Such a task can be tedious and prone to error. Thus it is important for a user to be able to perform such mass changes in an efficient manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for performing mass change to data. For example, attribute values in a data set can be replaced or overwritten based on a user request. The user request can include selections and inputs received via a user interface. The user can limit the attribute values that are replaced based on attribute, attribute value, and/or other designation.

For example, a method can be provided for performing mass change. The method comprises receiving a designation of one or more of the data elements, receiving an attribute selection, and providing a candidate list for display. The candidate list comprises an "all" attribute values option and possible attribute values for the selected attribute present in the designated data elements. The method further comprises receiving a selection of a value from the candidate list, receiving an input of a new attribute value, and initiating a change of a portion of the designated data elements corresponding to the selected attribute and the selection from the candidate list to the new attribute value.

As another example, a method can be provided for presenting a user interface for performing mass change. The method comprises presenting the data so that a user can designate a portion of the data for mass change, presenting a first user interface element for selecting an attribute, based on the selected attribute, presenting a candidate list listing attribute values of the selected attribute present in the user designated portion of the data, and presenting a second user interface element for inputting a new attribute value to replace attribute values in the user designated portion of the data corresponding to the selected attribute and a selection from the candidate list. The presenting of the candidate list can include presenting an "all" attributes option as part of the candidate list.

Described methods can be implemented at least in part by a software component and/or system, which is referred to herein as a mass change component (MCC). The MCC can control either directly or indirectly a user interface for performing the mass change. The MCC can initiate the mass change to the stored data based on user selections and inputs received via the user interface. The MCC can operate independent of the data store storing the data for mass change. The MCC can also receive commands (e.g., from a user interface or other component or system) for performing the mass change.

The foregoing and other objects, features, and advantages will become more apparent from the following detailed description, which proceeds with reference to the accompanying figures.

BRIEF DESCRIPTION OF THE DRAWINGS

FIG. 1 is an illustration of an exemplary user interface for performing mass change to data.

FIG. 2 is an illustration of an exemplary user interface for presenting data for mass change.

FIG. 3 is an illustration of an exemplary user interface for performing mass change to data.

FIG. 4 is an illustration of an exemplary user interface for performing mass change to data.

FIG. 5 is an illustration of an exemplary user interface for performing mass change to data.

FIG. 6 is an illustration of an exemplary user interface for presenting data for mass change.

DETAILED DESCRIPTION

Example 1

Exemplary Overview

Figure 7:
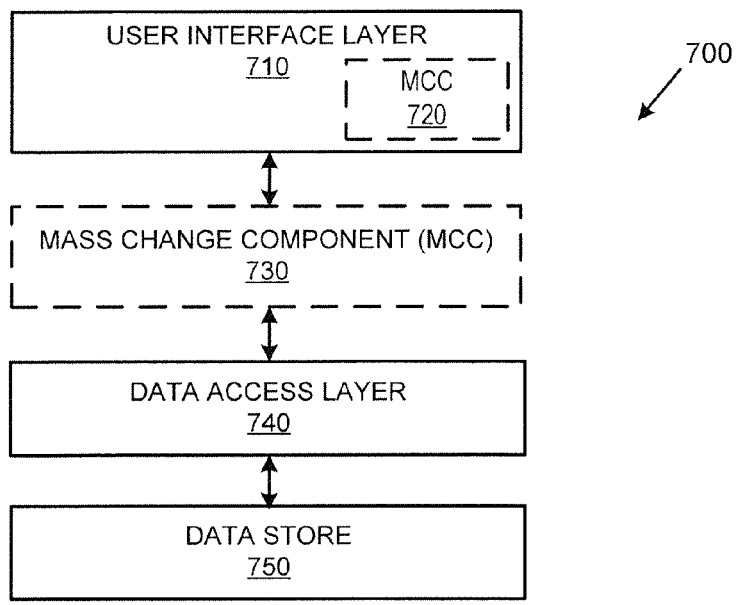
FIG. 7 is block diagram of an exemplary computing environment with a mass change component for performing mass change to data.

The following description is directed to techniques and solutions for performing mass change to data. An example of a mass change is a change that is made to one or more attribute values in a data set based on a user request. The change can be limited to one or more user-selected attributes, and/or to one or more designated data elements. The change can be applied across all attribute values or only to selected attribute values, sometimes referred to as candidates. The candidates are selected from a candidate list that includes attribute values present in one or more designated data elements. Typically the change involves replacing attribute values of designated data elements with a new attribute value input by the user, although other types of changes are possible.

In general, a user interface assists the user in performing the mass change. For example, a user can designate data for mass change either using a user interface or by other known methods such as using a keyboard. User interface elements can be displayed to the user for selecting an attribute and an attribute value from a candidate list for mass change. The user interface can also enable a user to input a new attribute value. The designated data is then changed according to the user selections to the new attribute value. In some examples, the user interface displays the changed data to the user.

In general, a mass change component (MCC) executes the mass change. That is, the MCC enables a user to perform the mass change to designated data. The MCC receives user input through an associated user interface and initiates a change to attribute values of the designated data based on the user input. For example, the MCC can determine the attributes that are to be displayed via the user interface for selection by the user. The attributes to be displayed can be limited to the attributes present in the designated data or to another predetermined set of attributes, or include all attributes associated with the data. Additionally, the MCC can determine the attribute values to be displayed in a candidate list via the user interface. The candidates in the candidate list can be determined by the MCC based on the selected attribute and any user-designated data. The MCC can also receive a new attribute value from the user via the user interface, as well as user selections of the attribute and the attribute value from the candidate list. Based on the user selections, the MCC initiates the mass change to the data.

Mass change techniques and tools described herein can provide efficient and flexible solutions for user manipulation of data, such as by improving usability and user experience when performing a mass change to data.

Example 2

Exemplary Data

In any of the examples herein, data is any information that is associated with an attribute and an attribute value. In general, an attribute is a category of properties, qualities or characteristics of an object, item or other entity. Each attribute is associated with one or more values (e.g. a set of values), referred to herein as attribute values. Attribute values describe the corresponding property, quality or characteristic identified by the attribute.

For example, for data describing products in a grocery store, each product can be associated with several attributes such as manufacturer, brand, material group, price, UPC bar code, etc. For each of these attributes, there is a corresponding set of attribute values. In this example, the set of attribute values that corresponds to the attribute "manufacturer" includes all the names of the manufacturers for the products. Each product has an attribute value of the name of the manufacture for that particular product. The attribute "brand" has a value for each product that corresponds to the brand name for that product, and so on.

As another example, for data describing books, each book can be associated with several attributes such as author, publisher, genre, format, date of publication, etc. In this example, the set of attribute values corresponding to the attribute "format" includes three possible values: electronic, paperback, or hardcover, while the attribute "author" takes on values that correspond to the name of the book's author.

Data can be arranged as data elements or components of a database, such as in a table or as fields. Tools and techniques described herein are not limited by the data format or the manner or method of data storage.

Example 3

Exemplary User Interface for Mass Change

Techniques for mass change described herein can be implemented using various user interfaces, and are therefore not limited to the specific user interfaces illustrated in the figures.

FIG. 1 is an illustration of an exemplary user interface 100 for performing mass change to data. The user interface 100 includes elements 102, 104, 106, 108 for receiving user selections and input. The elements 102, 104, 106, 108 can be configured as radio or other buttons, dropdown lists, list boxes, checkboxes, textboxes, fields or other user interface elements or combinations thereof. The element 102 enables the user to select an attribute associated with a set of data. For example, the user can input (e.g. type) an attribute into a textbox or select an attribute from a dropdown list. The attribute selection made via element 102 can then be communicated to a MCC.

The element 104 enables the user to select a candidate from a list of candidate attribute values. As will be explained in more detail below, the candidate list is determined by the MCC and can depend on both the user selection via element 102 and on any user-designated data elements. The element 106 enables the user to input a new attribute value. For example, the user can input (e.g. type) the new attribute value into a textbox or the new value can be selected from a predetermined list of values, such as a predetermined domain or group of fixed values. The candidate selection made via element 104 and the new attribute value input via element 106 can be communicated to the MCC. The element 108 is optional and enables the user to make mass changes based on multiple attributes and/or attribute values (see, e.g., FIG. 5).

When the user has completed selections and inputs, a user interface element such as an "OK" button 110 can be used to communicate with the MCC and to initiate the mass change. The mass change initiated by the MCC can be based on user selections via elements 102 and 104, user input via element 106, and any user-designated data.

Example 4

Exemplary Designation of Data

In some embodiments, mass changes described herein are limited to data elements designated by a user. Often such designations are made through a user interface, although other methods of designating data elements are supported. For example, a user interface can present the data to the user, who selects or highlights data using conventional techniques. However, in other examples, a user could designate data by designating or searching according to certain criteria (e.g., data modified after a particular date, etc.), by selecting a file by name, or by typing row and/or column numbers or other indicators for data in a table format. The data may or may not be presented to the user during the designation process. Once a user designation of data elements has been made, either via a user interface or other means, a user interface for performing mass change is provided to the user. Also, the designation is communicated to the MCC.

Example 5

Exemplary User Interface for Presenting Data

In any of the examples herein, data can be presented by a user interface to facilitate designation of the data. FIG. 2 is an illustration of an exemplary user interface 200 for presenting data 220 for mass change, with designated data 228. The user interface 200 presents the data 220 in a table 222 with data elements 226 organized in columns according to associated attributes 224. For example, each row in the table 222 can represent a different product and each column represents a different attribute 224, with the data elements 226 providing the attribute values for each of the products. In the figure, the data 220 is associated with the following attributes: manufacturer, material number, brand, internal ID, and material group. The "brand" attribute has a corresponding attribute value of "ABC" for all rows (e.g., for each product), while the "material group" attribute can take on any value within the following set of attribute values: meat, produce, fish or frozen food. Likewise, the attribute "manufacturer" has three possible attribute values: Company A, MF West, and MF South.

Four rows 228 are shown as selected by the user, and each element in the rows 228 corresponds to a designated data element. A user can designate data elements using any conventional technique for selecting or highlighting one or more elements in a table. For example, the user may perform the designation by left-clicking with a mouse in a manner that selects an entire row, by using control- or shift-clicking, by right-clicking on one or more cells, or by typing in row and/or column selections. Although FIG. 2 illustrates designation of data elements by row, data elements may be designated individually, by column, or by other grouping.

In the figure, the data 220 is presented along with optional user interface elements 230, 232, 234. The elements 230, 232, 234 can be configured in various ways to assist the user in manipulating or viewing the displayed data 220. For example, the element 230 can be a button, which when clicked or selected by the user causes a mass change user interface such as user interface 100 in FIG. 1 to appear on the display as a pop-up window or integrated into the interface 200.

In addition to the data 220, the user interface 200 also includes an optional search portion 210, which includes elements 212 and 214. For example, elements 212 and/or 214 can enable user input, such as inputting of search criteria, and can be used to collect or find the data 220 and/or to select the data elements 228. The data 220 can be presented as a portion of a larger user interface, as shown in FIG. 2, or as an independent interface (see, e.g., FIG. 6).

Although the presentation of data in rows and columns is a commonplace manner of displaying data and for facilitating user designation of data elements, data can be presented in different formats than the table format of FIG. 2.

Example 6

Exemplary User Interface for Mass Change

Techniques for mass change described herein can be implemented using various user interfaces, and are therefore not limited to the specific user interfaces illustrated in the figures.

Referring to FIG. 3, an exemplary user interface 300 for mass change of data includes elements 301, 304, 306, 308 for receiving user selections and input. The element 301 indicates an attribute selection made by the user from a list of attributes 302, and the attribute selection made via element 301 can be communicated to an MCC. The list of attributes 302 can be determined by the MCC, or the list can be provided to the MCC or user interface by another component (e.g., a data store, backend layer, data access layer, etc.). In this example, the list 302 is limited to a predetermined or predefined list of three attributes: manufacturer, brand, and material group. In the illustrated example, the list 302 is limited to the attributes that a particular user is permitted to change. That is, changes to attributes "material number" and "internal ID" are restricted or prohibited and therefore do not appear on the list 302. Alternatively, the list 302 can include all attributes for that data set or be limited to the attributes present in the designated data elements.

The element 304 enables the user to select from a list of candidate attribute values, and the element 306 enables the user to input a new attribute value. The element 308 is optional and enables the user to make mass changes based on multiple attributes and/or attribute values (see, e.g., FIG. 5).

Example 7

Exemplary User Interface for Mass Change

Techniques for mass change described herein can be implemented using various user interfaces, and are therefore not limited to the specific user interfaces illustrated in the figures.

Referring to FIG. 4, an exemplary user interface 400 for mass change of data includes elements 402, 414, 406, 408 for receiving user selections and input. The element 402 indicates an attribute selection made by the user, which can be communicated to a MCC. As shown, the user has selected the attribute "material group." The element 414 indicates a user selection from a list of candidate attribute values 404. The user selection via element 414 can also be communicated to the MCC. As shown, the user has selected the attribute value "meat." The candidate list 404 includes an "all" attribute values option 416, which has the effect of selecting all the attribute values in the candidate list 404 (i.e., it will have the effect of selecting all of meat, fish and frozen foods).

The candidate list 404 is determined by the MCC and is limited to the attribute values for the selected attribute 402 that are present in the designated data elements. Specifically, referring to FIG. 2, the designated elements 228 for the selected attribute (i.e., "material group") include the following attribute values: meat, fish, and frozen food. Although the attribute "material group" can also take on a value of "produce," because no data elements having the attribute value "produce" are present in the designated elements 228, the MCC does not include the value "produce" in the candidate list 404. In addition, although the attribute value "fish" appears twice within the designated elements 228, only one instance of the value is listed in the candidate list 404. In this manner, the candidate list 404 lists the possible values (e.g., one instance of each possible value) for the selected attribute 402 that are present in the designated elements 228.

The element 406 enables the user to input a new attribute value, and the optional element 408 enables the user to make mass changes based on multiple attributes and/or attribute values (see, e.g., FIG. 5).

Example 8

Exemplary User Interface for Mass Change

Techniques for mass change described herein can be implemented using various user interfaces, and are therefore not limited to the specific user interfaces illustrated in the figures.

FIG. 5 illustrates an exemplary user interface 500 for mass change of data based on multiple attributes and attribute values. Elements 502, 512, 522 indicate attribute selections made by the user, which can be communicated to a MCC to populate candidate lists (not shown) used to make candidate selections via elements 504, 514, 524. The candidate lists for the elements 504, 514, 524 are determined by the MCC and are limited to the attribute values for the selected attributes 502, 512, 522, respectively, that are present in the designated data elements. The elements 504, 514, 514 indicate user selections of attribute values, which are communicated to the MCC. Elements 506, 516, 526 indicate new attribute values input by the user, which are also communicated to the MCC.

The user interface 500 can include user interface elements 508, 518 for expanding or reducing elements for enabling user attribute/attribute value selections.

Example 9

Exemplary User Interface for Presenting Data

In any of the examples herein, data can be presented through a user interface after the mass change is performed. For example, FIG. 6 is an illustration of an exemplary user interface 600 for presenting data 620 after the mass change indicated by the user interface 500 in FIG. 5 has been performed on the designated data 228 in FIG. 2. The user interface 600 presents the data 620 in a table 622 with data elements 626 organized in columns according to associated attributes 624. The data 620 can be presented as a portion of a larger user interface or as an independent interface. In addition, although the data is presented in rows and columns, data can be presented in formats other than the table format of FIG. 6.

Referring to FIGS. 2, 5 and 6, the mass change results presented via interface 600 include several data elements which have been changed or replaced with new attribute values. These changed data elements correspond to a portion of the designated data elements 228. The changes were initiated by the MCC and made in accordance with the user selections and inputs made via the interface 500. Specifically, a data element 642 has been changed from "meat" to "beef" according to the user selections and inputs via elements 502, 504, 506. That is, the changed element 642 is associated with the selected attribute 502, and previously had the same value as the selected attribute value 504. Also, the element 642 is one of the designated elements 228. Although another data element 641 in the table 622 is also associated with the attribute "material group" and has the value of "meat," the element 641 has not been subject to the mass change because it is not part of the designated elements 228.

Data elements 644 and 648 have been changed to "seafood" in accordance with the user selections and inputs of elements 512, 514, 516. Data element 646, although one of the designated data elements 228, remains unchanged since the attribute value "frozen food" was not selected via the interface 500.

Data elements 652, 654, 656, 658 have been replaced with the attribute value "Foods, Inc." according to the user selections and inputs of elements 522, 524, 526. Notably, the element 524 indicates that the user has selected the <all> attributes option. This selection has the effect of selecting all the attribute values for the selected attribute indicated by element 522 that appear in the designated elements 228. That is, it has the effect of selecting the following attribute values at the same time: "Company A," "MF West," and "MF South." Consequently all the attribute values for the designated cells corresponding to the attribute "manufacturer" (i.e., cells 652, 654, 656, 658) have been changed to "Foods, Inc."

In the figure, the data 620 is presented along with optional user interface element 630. The element 630 can be configured to assist the user in manipulating or viewing the displayed data 620. For example, the element 630 can be a button, which when clicked or selected by the user causes a mass change user interface such as the user interface 500 in FIG. 5 to appear on the display as a pop-up window or integrated into the interface 600.

Example 10

Exemplary Computing Environment for a Mass Change Component

FIG. 7 is a block diagram of an exemplary computing environment 700 with a mass change component (MCC) 720, 730 for performing mass change to data. The MCC is a software component and/or system, which can be configured to perform methods described herein. In general, the MCC 720, 730 communicates with a user interface layer 710 and initiates a mass change to data in a data store 750 based on information received via a user interface from a user. The user interface layer 710 controls the presentation of the user interface, which can be any user interface described herein, and can include one or more programs or applications for executing user interface components.

The MCC can be implemented as a part of the user interface layer 710 (illustrated in FIG. 7 as MCC 720), perhaps as a user interface component or part of another user interface component, or the MCC can be implemented as a separate component in the architecture of the computing environment 700 (illustrated in FIG. 7 as MCC 730). Typically, the MCC 720, 730 receives user selections, inputs and/or data designations made via the user interface. The MCC determines attribute values to be presented in a candidate list of the user interface. The MCC can also determine attributes to be presented in an attribute list of the user interface. The MCC can control all or a portion of the user interface. Alternatively, the MCC can provide information or instructions to the user interface layer 710 for presenting the user interface.

The data store 750 stores the data for mass change. The data store 750 can include code or software for performing specific tasks or functions to manage the stored data, or the data store 750 can be part of a backend layer that manages the storage of data as well as the interface with a data access layer 740. For example, such a backend layer can include a service provider, various business objects and application programming interfaces. The backend layer can include one or more computer systems and/or servers. The data store 750 can be located within the same computing environment as the MCC, or within a different computing environment. For example, the data store 750 can be a remote server that communicates with the MCC via cloud computing services.

The data access layer 740 controls the relationship between the user interface layer 710, the MCC 730, and the data store 750. For example, the data access layer 740 can contain software and/or hardware for communicating instructions/information from the MCC 720 or 730 to the data store 750 so that the mass change can be performed, and/or for communicating data from the data store 750 to the user interface layer 710 for display. In general, the data access layer 740 contains some framework for backend access, which is based on the particular data store 750, and the MCC is configured to communicate with the data access layer 740 based on that framework.

The MCC initiates the mass change based on user selections, inputs, and/or data designations received via the user interface. For example, the MCC can issue a request or send commands to the data store 750 via the data access layer 740 indicating the data element(s) to be replaced and the new attribute value(s) for the replaced element(s). For example, the MCC can send the user selections, inputs, and/or data designations to the data store 750 via the data access layer 740. Consequently, the data store 750 manipulates the data to perform the mass change. For example, the appropriate data elements can be overwritten with new attribute values.

In some implementations, the MCC is implemented independent of the data store 750. That is, the MCC is configured to communicate with the data access layer 740, which is configured to communicate MCC requests to the data store 750. Thus, the data access layer 740 serves as an intermediary between the MCC (and/or the user interface layer 710) and the data store 750. In this manner, the data store 750 or backend layer is independent of the MCC and need not be specially configured to communicate with the MCC. In other implementations, the MCC is integrated with the data access layer 740 and/or the data store 750.

In some embodiments, the MCC is implemented as a reuse component. That is, the MCC can be configured as a module or component that can be implemented as part of an application without additional coding or programming. For example, a reuse MCC may need to be configured for a particular application. However, a developer's skills may not be necessary for implementation. In this manner, the MCC functionality can be easily reused in different applications.

Example 11

Exemplary Implementations of a Mass Change Component

In a particular implementation, the MCC is implemented as part of a WebDynpro component. Specifically, the MCC is implemented as a generic user interface building block (GUIBB) such as a modified generic feeder class. In this manner, the MCC is integrated into the user interface layer as a "mass change feeder class" and is implemented as a reuse component. The mass change feeder class can be configured to communicate with a backend layer using the Service Provider Infrastructure or other known data access channel. Thus, any backend layer can be used with the mass change feeder class implementation, with the appropriate data access channel. Floorplan Manager can be used to build an application user interface with GUIBBs, including the mass change feeder class.

In the mass change feeder class implementation, the MCC can be configured to allow enhancement of functionality by mechanisms such as inheritance that allow a reusing application to add application specific logic that is not part of the reuse component. In this manner, the reuse component does not limit the reuse capability. For example, an application could add various functionalities to the MCC, such as by configuring the mass change feeder class to be capable of copying data sets or capable of permitting navigation within certain columns.

In another particular implementation, the MCC is implemented as part of SAPGUI technology as a reuse component and without the use of Floorplan Manager. The MCC can then be configured to access a backend layer via an appropriate data access channel, such as the appropriate Service Provider Infrastructure. In this implementation, the MCC could be configured as a function module or a report that internally creates the SAPGUI screens.

Although not described in detail, the MCC could be implemented as part of user interface technologies known in the art.

Example 12

Exemplary Methods for Performing Mass Change to Data

Figure 8:
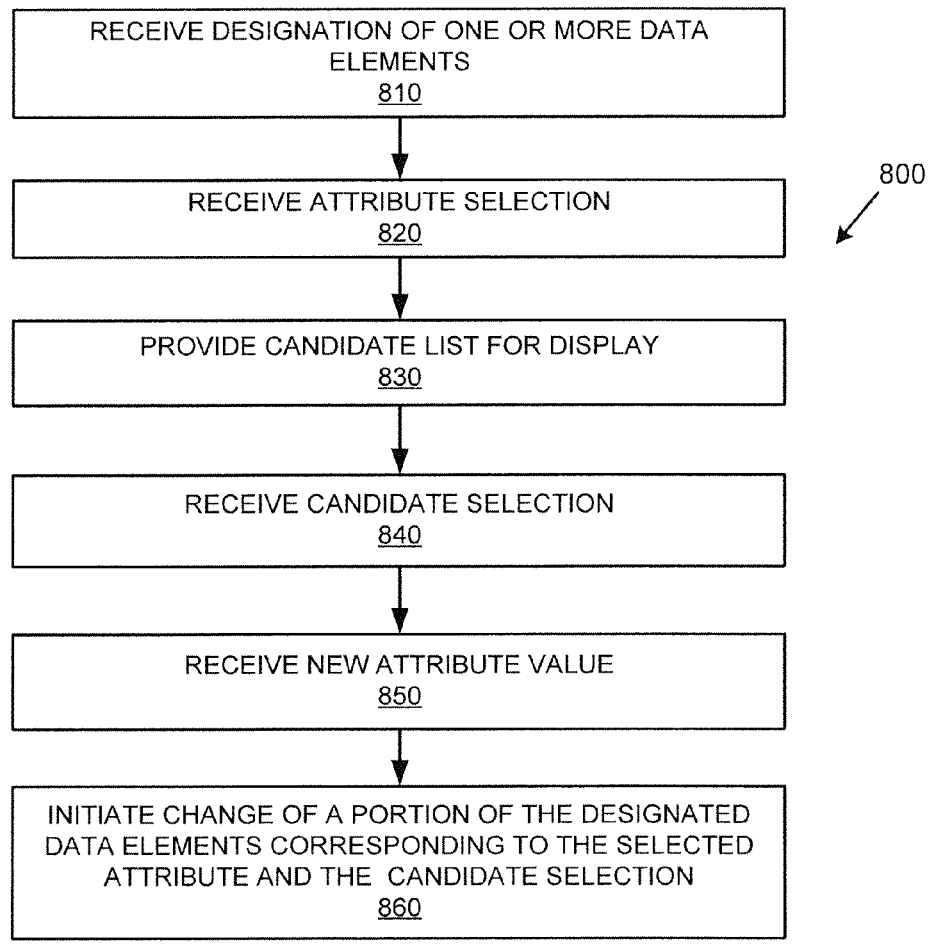
FIG. 8 is a flowchart of an exemplary method for performing mass change to data.

FIG. 8 is a flowchart of an exemplary method 800 for performing mass change to data. At 810, a designation of one or more data elements is received. For example, the designation can identify the one or more data elements that have been selected by a user. At 820, an attribute selection is received. For example, the attribute can be selected from a list of attributes presented to the user via a user interface.

At 830, a candidate list is provided for display. The candidate list can include an "all" attribute values option as well as attribute values for the selected attribute present in the designated data elements. At 840, a candidate selection is received. For example, the candidate list can be displayed in a dropdown format as part of the user interface, and the user can select an attribute value from the dropdown.

At 850, a new attribute value is received. For example, the new attribute value can be input by the user via the user interface. At 860, a mass change is initiated. The mass change is to a portion of the designated data that corresponds to the selected attribute and to the candidate selection. The attribute values for the portion of the designated data are changed to the new attribute value. The mass change can be initiated by sending a communication to a backend layer or a data store that identifies the data elements to be changed, as well as the new attribute value to which the data elements are to be changed. For example, the mass change can be initiated by sending the selected attribute and/or the candidate selection to the backend layer or data store. In addition, an indication or other communication identifying the designated data elements can be sent to the backend layer or to the data store. For example, the data elements can be identified by row and column number, or by other indicators sufficient to identify a location within a data store for each of the data elements.

Figure 9:
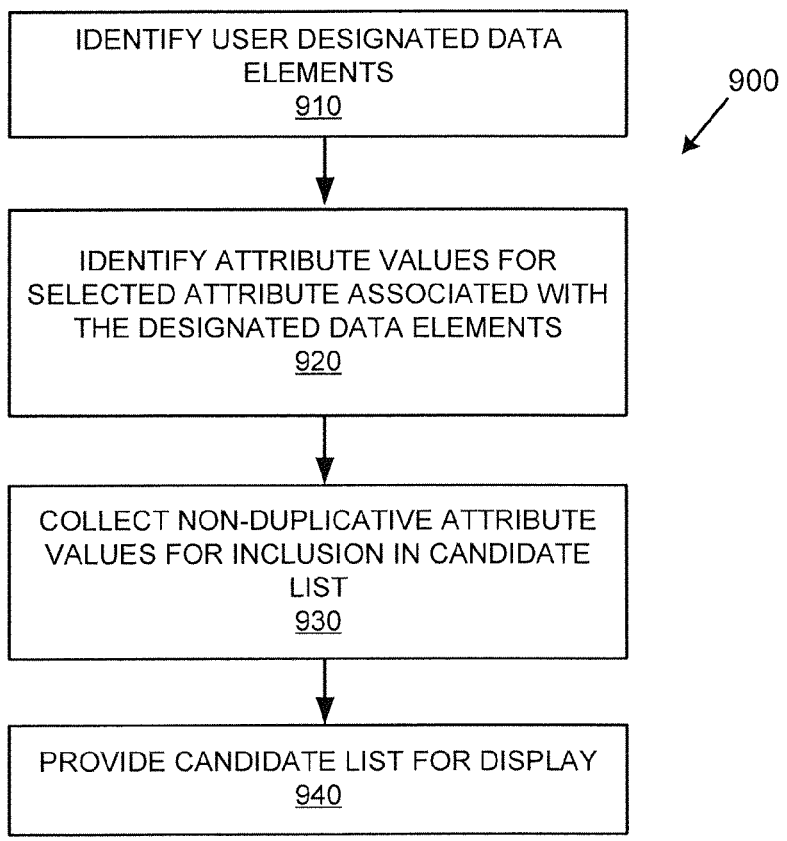
FIG. 9 is a flowchart of an exemplary method for providing a candidate list for display as part of a method for performing mass change to data.

FIG. 9 is a flowchart of an exemplary method 900 for providing a candidate list for display as part of a method, such as method 800, for performing mass change to data. For example, at 830, the method 900 can be performed as part of the providing of the candidate list for display. Specifically, at 910, designated data elements are identified. The data elements can be identified by row/column or other storage location indicator, by attribute value, or both. For example, the user interface can communicate the designation to the MCC. Alternatively, the attribute values for the designated data elements can be communicated to the MCC, such as by a data store and/or access layer. At 920, attribute values for a selected attribute (see, e.g., 820 of method 800) that are associated with the designated data elements are identified. For example, the MCC can communicate with the data store to determine the values. Alternative, the MCC can select from the attribute values identified for the designated elements the attribute values corresponding to the selected attribute.

At 930, non-duplicative attribute values are collected for inclusion in the candidate list. For example, only one instance of each attribute value present in the designated data is provided for display in candidate list. At 940, the candidate list is provided for display.

Example 13

Exemplary Method for Presenting a User Interface

Figure 10:
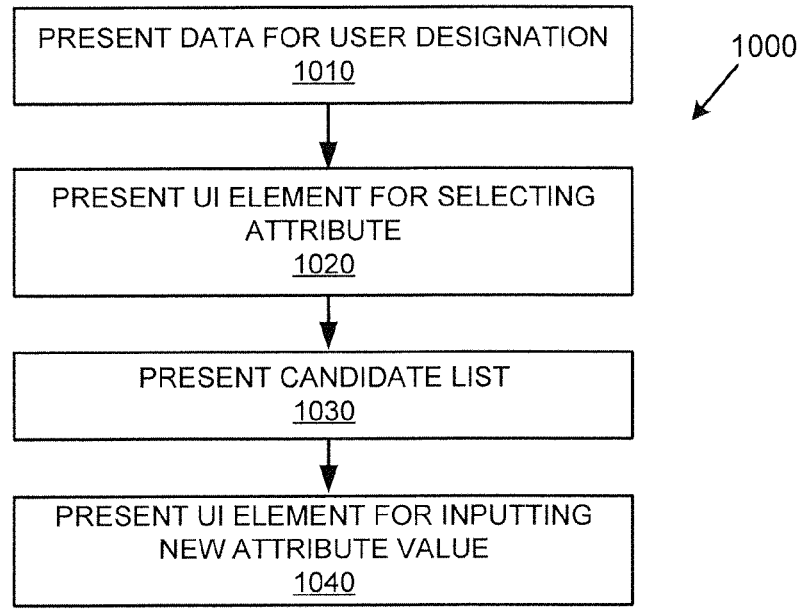
FIG. 10 is a flowchart of an exemplary method for presenting a user interface for performing mass change to data.

FIG. 10 is a flowchart of an exemplary method 1000 for performing mass change to data. At 1010, data is presented so that a user can designate data for mass change. For example, the data can be presented as a table, and the user can designate data by selecting or highlighting rows of the table.

At 1020, a first user interface element is presented for selecting an attribute. For example, the first user interface element can list a predetermined group of attributes, or the listed attributes include all attributes associated with the data or with a designated portion of the data. At 1030, a candidate list is presented. The candidate list can include attribute values present in the user designated portion of the data and associated with the selected attribute and/or an "all" attribute values option.

At 1040, a second user interface element is presented for inputting a new attribute value to replace attribute values in the user designated portion of the data. The replaced attribute values also correspond to the selected attribute and a selection from the candidate list.

Example 14

Exemplary Computing Systems

Figure 11:
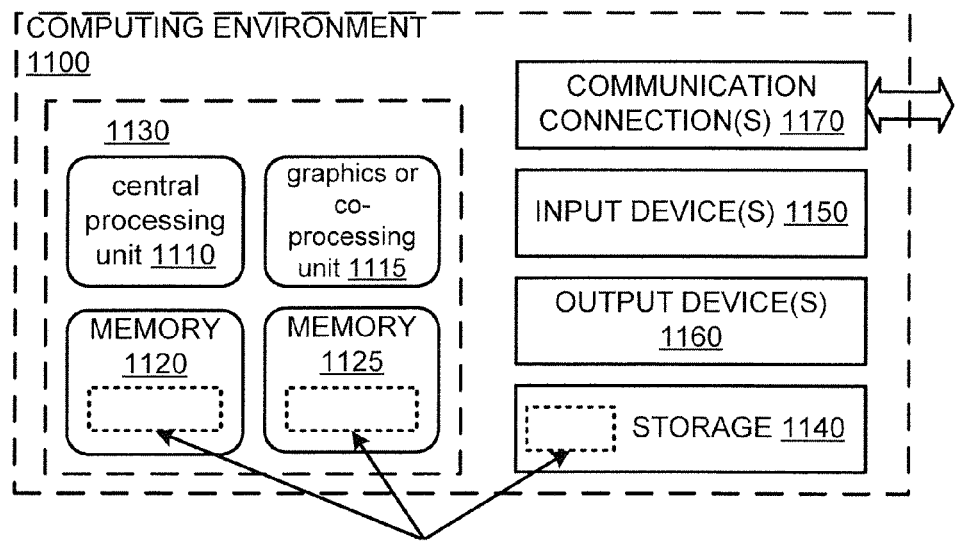
FIG. 11 is a diagram of an exemplary computing system in which some described embodiments can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s). For example, software 1180 can include a MCC as described herein.

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Referring to FIG. 7, the user interface layer 710, the MCC 720, 730, the data access layer 740, and the data store 750 can be implemented as part of the same computing environment 1100, or as part of two or more computing environments. For example, the data store 750 can be implemented as a remote server that is accessed via connections 1170 by an MCC implemented in software 1180.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15

Exemplary Cloud Computing Environment

Figure 12:
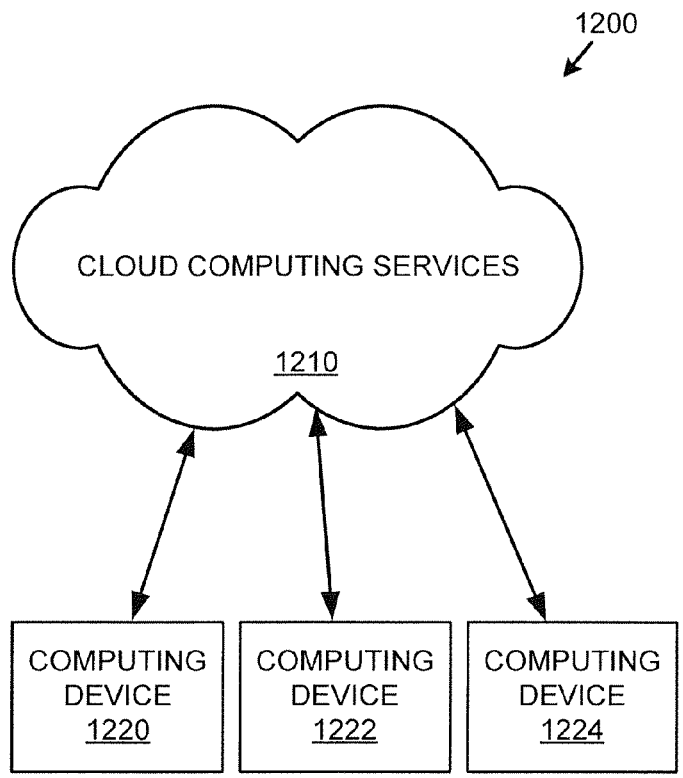
FIG. 12 is an exemplary cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Referring to FIG. 7, one or more of the user interface layer 710, the MCC 720, 730, the data access layer 740, and the data store 750 can be implemented as part of the cloud computing services. Likewise, one or more of the user interface layer 710, the MCC 720, 730, the data access layer 740, and the data store 750 can be implemented as part of one or more of the computing devices 1220, 1222, 1224. For example, the data store 750 can be accessed via the cloud by the computing device 1220 running a MCC, as described herein.

Example 16

Exemplary Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or non-volatile memory components (such as flash memory or hard drives)). By way of example and with reference to FIG. 11, computer-readable storage media include memory 1120 and 1125, and storage 1140. As should be readily understood, the term computer-readable storage media does not include communication connections (e.g., 1170) such as modulated data signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, HTML5, ABAP, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved.

Alternatives and Variations

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

I claim:

1. A method, implemented at least in part by one or more computing devices, for performing mass change to data elements, each data element being associated with an attribute and an attribute value, the method comprising:
   receiving, from a user performing the mass change, a designation of one or more of the data elements;
   providing an attribute list for display, wherein the attribute list is a predetermined list of attributes that includes less than all of the attributes associated with the data elements, wherein providing the attribute list for display comprises:
      determining, by a software component of the one or more computing devices and not by the user, which attributes, from all of the attributes associated with the data elements, that the user is permitted to change, and which attributes are restricted and that the user is not permitted to change, wherein at least one of the attributes is restricted; and
      selecting only the determined attributes that the user is permitted to change for inclusion in the attribute list that is provided for display to the user that includes less than all of the attributes associated with the data elements;
   receiving an attribute selection from the attribute list;
   providing a candidate list for display, wherein the candidate list is assembled based on the designated data elements and the selected attribute and comprises:
      an "all" attribute values option for performing mass change to all attribute values in the candidate list; and
      possible attribute values for the selected attribute present in the designated data elements;
   receiving a selection of an attribute value from the candidate list;
   receiving an input of a new attribute value; and
   initiating a change to attribute values of the designated data elements corresponding to the selected attribute and the attribute value selected from the candidate list to the new attribute value.

2. The method of claim 1, wherein the designation identifies the one or more data elements, and wherein the candidate list is limited to the "all" attribute values option and attribute values of the designated data elements corresponding to the selected attribute.

3. The method of claim 1, wherein the providing the candidate list for display comprises:
   identifying attribute values for the one or more designated data elements associated with the selected attribute; and
   collecting one instance of each of the identified attribute values for inclusion in the candidate list.

4. The method of claim 1, wherein the designation is received via a user interface based on a user selection of the one or more of the data elements.

5. The method of claim 1, wherein the designation is received via a user interface based on a user selection of one or more rows of data elements.

6. The method of claim 1, wherein the candidate list is displayed in a dropdown format as part of a user interface.

7. The method of claim 1, wherein the initiating the change comprises sending the new attribute value to a data store storing the data elements.

8. The method of claim 7, wherein the initiating the change further comprises sending to the data store an indication identifying the designated data elements.

9. The method of claim 1, wherein the attribute selection is a first attribute selection, the candidate list is a first candidate list, the selection from the candidate list is a first candidate, and the new attribute value is a first new attribute value, the method further comprising:
   receiving a second attribute selection;
   providing a second candidate list for display, wherein the second candidate list comprises the "all" attribute values option and possible attribute values for the second attribute selection present in the designated data elements;
   receiving a selection of second candidate from the second candidate list;
   receiving an input of a second new attribute value; and
   initiating a change of a portion of the designated data elements corresponding to the second selected attribute and the second candidate to the new attribute value.

10. One or more computer-readable storage media storing computer-executable instructions for causing a computing device to perform a mass change to data elements, the instructions comprising:
   receiving, from a user performing the mass change, a designation of one or more of the data elements, each data element being associated with an attribute and an attribute value;
   providing an attribute list for display, wherein the attribute list is a predetermined list of attributes that includes less than all of the attributes associated with the data elements, wherein providing the attribute list for display comprises:
      determining, by a software component of the computing device and not by the user, which attributes, from all of the attributes associated with the data elements, that the user is permitted to change, and which attributes are restricted and that the user is not permitted to change, wherein at least one of the attributes is restricted; and
      selecting only the determined attributes that the user is permitted to change for inclusion in the attribute list that is provided for display to the user that includes less than all of the attributes associated with the data elements;
   receiving an attribute selection from the attribute list;
   identifying attribute values for the designated data elements;
   collecting one instance of the identified attribute values for the designated data elements that are associated with the selected attribute for inclusion in a candidate list;
   providing the candidate list for display, wherein the candidate list comprises an "all" attribute values option for performing mass change to all attribute values in the candidate list and the collected attribute values;
   receiving a selection of a value from the candidate list;
   receiving an input of a new attribute value; and
   initiating a change to attribute values of the designated data elements corresponding to the selected attribute and the selection from the candidate list to the new attribute value.

11. A method of presenting on a display a user interface for performing mass change to data, the data described by a plurality of attributes and corresponding sets of attribute values, the method comprising:

presenting the data so that a user can designate a portion of the data for mass change;

presenting an attribute list listing attributes present in the user designated portion of the data, wherein the attribute list is a predetermined list of attributes that includes less than all of the attributes associated with the data, wherein presenting the attribute list comprises:

determining, by a software component and not by the user, which attributes, from all of the attributes associated with the data, that the user is permitted to change, and which attributes are restricted and that the user is not permitted to change, wherein at least one of the attributes is restricted; and selecting only the determined attributes that the user is permitted to change for inclusion in the attribute list that is provided for display to the user that includes less than all of the attributes associated with the data;

presenting a first user interface element for selecting an attribute from the attribute list;

based on the selected attribute and the user designated portion of the data, presenting a candidate list listing attribute values of the selected attribute present in the user designated portion of the data; and presenting a second user interface element for inputting a new attribute value to replace attribute values in the user designated portion of the data corresponding to the selected attribute and a selection from the candidate list.

12. The method of claim 11, wherein the candidate list also lists an "all" option for selecting all attribute values in the candidate list.

13. The method of claim 11, wherein the presenting of the data comprises presenting the data as a table of rows and columns, wherein the columns correspond to attributes of the data.

14. The method of claim 13, wherein the presenting of the data is so that the user can designate the portion of the data for mass change by selecting one or more rows.

15. The method of claim 11, wherein the presenting of the attribute list is in a dropdown format.

16. The method of claim 11, wherein the presenting of the data comprises presenting a button which, when clicked by the user, causes a pop-up window to be displayed, and wherein the presenting of the first user interface element, the attribute list, the candidate list and the second user interface element is within the pop-up window.

17. The method of claim 11, further comprising:
presenting the data with the replaced attribute values.

18. The method of claim 11, wherein the candidate list is a first candidate list, the selected attribute is a first selected attribute, and the new attribute value is a first new attribute value, the method further comprising:

presenting a third user interface element for selecting a second attribute;

based on the second selected attribute, presenting a second candidate list listing attribute values of the second selected attribute present in the user designated portion of the data; and presenting a fourth user interface element for inputting a second new attribute value to replace attribute values in the user designated portion of the data corresponding to the second selected attribute and a selection from the second candidate list.

19. The method of claim 1, wherein the attribute list is a first attribute list, the candidate list is a first candidate list, and the method further comprises:

providing a second attribute list for display, wherein attributes included in the second attribute list are the same as attributes included in the first attribute list;

receiving an attribute selection from the second attribute list; and providing a second candidate list for display, wherein the second candidate list is assembled based on the designated data elements and the selected attribute from the second attribute list.

* * * * *